United States Patent [19]
Nakajima

[11] Patent Number: 5,610,729
[45] Date of Patent: Mar. 11, 1997

[54] NOISE REDUCTION APPARATUS FOR REDUCING NOISE IN DECODING OF MOVING PICTURE SEQUENCE

[75] Inventor: Yasuyuki Nakajima, Tokyo, Japan

[73] Assignee: Kokusai Denshin Denwa Kabushiki Kaisha, Japan

[21] Appl. No.: 382,996

[22] Filed: Feb. 3, 1995

[30] Foreign Application Priority Data

Feb. 22, 1994 [JP] Japan ................................ 6-46562

[51] Int. Cl.$^6$ ............................ H04N 1/38; H04N 1/415; H04N 1/417
[52] U.S. Cl. ..................... 358/463; 358/430; 358/433; 358/539; 348/607
[58] Field of Search .................... 358/430, 433, 358/431, 432, 426, 427, 261.1–261.4, 500, 525, 530, 532, 539; 382/238, 251; 348/409, 415, 426, 421, 412

[56] References Cited

U.S. PATENT DOCUMENTS

| 5,091,782 | 2/1992 | Krause et al. ............... | 358/135 |
| 5,144,426 | 9/1992 | Tanaka et al. ............... | 358/133 |
| 5,387,938 | 2/1995 | Fukuda et al. ............... | 348/420 |

OTHER PUBLICATIONS

"Iterative Procedure for Reduction of Blocking Effects in Transform Image Coding", *IEEE Transactions on Circuits and Systems for Video Technology*, by Avideh Zakhor, vol. 2, No. 1, Mar. 1992, pp. 91–95.

*Primary Examiner*—Joseph Mancuso
*Assistant Examiner*—Jerome Grant, II
*Attorney, Agent, or Firm*—Westman, Champlin & Kelly, P.A.

[57] ABSTRACT

In picture decoding from compressed data, noise component is predicted for each pixel, and noise-free original picture data is predicted from the predicted noise component and the decoded picture data, thus permitting picture quality improvement to be obtained.

Horizontal and vertical picture noise reduction circuits are provided such that they are the same in the process contents and are different in the direction of data processing. An activity calculation circuit derives the activity of block-based decoded picture data, and a block mean noise prediction circuit predicts block mean noise according to the activity obtained in the activity calculation circuit. A pixel noise prediction circuit derives predicted noise in each pixel from the predicted block mean noise obtained in the block mean noise prediction circuit and the activity obtained in the activity calculation circuit. A filter coefficient determining circuit determines filter coefficients. A filter circuit predicts and outputs noise-free picture data.

8 Claims, 6 Drawing Sheets

FIG. 5a $$W(i, j) = \begin{vmatrix} 16 & 16 & 19 & 22 & 26 & 27 & 29 & 34 \\ 16 & 16 & 22 & 24 & 27 & 29 & 34 & 37 \\ 19 & 22 & 26 & 27 & 29 & 34 & 34 & 38 \\ 22 & 22 & 26 & 27 & 29 & 34 & 37 & 40 \\ 22 & 26 & 27 & 29 & 32 & 35 & 40 & 48 \\ 26 & 27 & 29 & 32 & 35 & 40 & 48 & 58 \\ 26 & 27 & 29 & 34 & 38 & 46 & 56 & 69 \\ 27 & 29 & 35 & 38 & 46 & 56 & 69 & 83 \end{vmatrix}$$

FIG. 5b $$W0(i, j) = \begin{vmatrix} 16 & 16 & 16 & 16 & 16 & 16 & 16 & 16 \\ 16 & 16 & 16 & 16 & 16 & 16 & 16 & 16 \\ 16 & 16 & 16 & 16 & 16 & 16 & 16 & 16 \\ 16 & 16 & 16 & 16 & 16 & 16 & 16 & 16 \\ 16 & 16 & 16 & 16 & 16 & 16 & 16 & 16 \\ 16 & 16 & 16 & 16 & 16 & 16 & 16 & 16 \\ 16 & 16 & 16 & 16 & 16 & 16 & 16 & 16 \\ 16 & 16 & 16 & 16 & 16 & 16 & 16 & 16 \end{vmatrix}$$

$$E(i, j) = \begin{vmatrix} 39657 & 6450 & 2218 & 744 & 673 & 487 & 398 & 353 \\ 6450 & 1049 & 361 & 121 & 110 & 79 & 65 & 57 \\ 2218 & 361 & 124 & 42 & 38 & 27 & 22 & 20 \\ 744 & 121 & 42 & 14 & 13 & 9 & 7 & 7 \\ 673 & 110 & 38 & 13 & 11 & 8 & 7 & 6 \\ 487 & 79 & 27 & 9 & 8 & 6 & 5 & 4 \\ 398 & 65 & 22 & 7 & 7 & 5 & 4 & 4 \\ 353 & 57 & 20 & 7 & 6 & 4 & 4 & 3 \end{vmatrix}$$

NOISE REDUCTION APPARATUS FOR REDUCING NOISE IN DECODING OF MOVING PICTURE SEQUENCE

BACKGROUND OF THE INVENTION

1. Field of the Invention

This invention relates to apparatus for reducing noise in moving picture sequence after decoding thereof and, more particularly, an apparatus which permits removal not only of noise at block boundary but also of noise in a block.

2. Description of the Prior Art

As a prior art concerning the reduction of noise in decoded picture, there is one in which the blocking noise is reduced by using LPF (Low Pass Filter) when decoding picture through compression thereof as DCT (Discrete Cosine Transform), as shown in, for instance, Avideh Zakhor, "Iterative Procedure for Reduction of Blocking Effects in Transform Image Coding", IEEE Transactions on Circuits and Systems for Video Technology, vol. 2, No. 1, March 1992, pp. 91–95).

In this prior art system, as shown in FIG. 10, a band limiting process in a band-limitation constraint circuit 31 and a quantization limiting process in a quantization constraint circuit 32 are performed repeatedly k times (k being a positive integer) for blocking noise reduction. Designated at 33 is a process execution times counting circuit. As the band-limitation constraint process, a LPF process of 3×3 taps is applied for decoded picture. As the quantization constraint process, on the other hand, the decoded picture is transformed again for each block through DCT into frequency components, the coefficient $C_{i,j,n}$ (n being the number of times of process execution) is compared with coefficient $C_{i,j,0}$ obtained in a decoding process after DCT, and a limit is provided lest the difference should exceed the permissible quantization step $\Delta Q$. Subsequently, the coefficient is restored to picture data through IDCT. In the prior art system, when the band-limitation constraint process and quantization constraint process have been repeatedly executed k times, the processing is ended, and picture is output.

In the prior art, blocking noise removal is performed by the filtering process and DCT and IDCT processes repeated 5 to 20 times (i.e., k=5 to 20). This is effective in case where a single frame of picture can be processed for long time as in the still picture. Where it is necessary to process as many as 30 frames per second as in moving picture sequence, however, carrying out such repeated process for each frame gives rise to a problem of extreme load on hardware.

Further, with an increase of the quantization step the permissible quantization step is increased, thus increasing the number of times of the blocking noise reduction filtering to increase the number k of times of repeated operation.

Further, in pictures that have been compression coded by the DCT or the like, not only block-like distortion (i.e., noise at block boundary or blocking noise) but also distortion around edges of characters or the like subject to great brightness changes (i.e., Mosquito noise) is generated. With the prior art system, only the former distortion, i.e., blocking noise, is considered, that is, it is impossible to remove the latter distortion.

SUMMARY OF THE INVENTION

An object of the invention is to provide a noise reduction apparatus, which can solve the above problems in the prior art and permits reduction of the amount of operations necessary for the noise reduction, which has been constituting a drawback in the prior art, without reducing the noise removal effect.

Another object of the invention is to provide a noise reduction apparatus for reducing noise in the decoding of moving picture sequence, which permits reduction of the blocking noise and mosquito noise.

A feature of the invention resides in a noise reduction apparatus, which comprises block mean noise prediction means for predicting noise in each block of picture from a quantization step for that block, pixel noise prediction means for predicting pixel noise from the predicted block mean noise and picture data, and means for predicting noise-free original picture from the predicted picture noise and decoded picture data in that block. According to the invention, the noise in the picture block is predicted by the block mean noise prediction means, pixel data noise is predicted from the block mean noise and pixel data, and noise-free original image with reduction of the blocking noise and mosquito noise is predicted from the predicted noise and the predicted pixel data noise and output.

Another feature of the invention resides in block mean noise prediction means as means for previously stated pixel noise prediction, from quantization step for the block and coding mode. According to the invention, the block mean noise is predicted from quantization step for the block and the coding mode, and noise-free original picture is predicted from the predicted noise and picture data through removal of blocking noise and mosquito noise and output.

Another feature of the invention resides in a noise reduction apparatus, which comprises means for deriving the activity of the decoded picture data for each block, means for predicting noise in that block from the activity derived by the activity deriving means, the quantization step for that block and the coding mode, means for predicting pixel noise from the block mean noise and picture data, and means for predicting noise-free original picture from the predicted noise and decoded picture data in the block by removing blocking noise and mosquito noise. According to the invention, the activity of the decoded picture data for that block is derived, block mean noise is predicted from that activity, the quantization step for the block and the coding mode, and noise-free original picture is predicted from the predicted noise and picture data through removal of blocking noise and mosquito noise and output.

According to the invention, noise is removed in units of pixcels through prediction of noise in units of blocks and in units of pixels. It is thus possible to remove noise only at the block boundary or remove noise along edges while preserving the edge portion, thus permitting picture quality improvement. Further, the sequence of operations need not be repeated, and thus it is possible to greatly reduce the processing time and greatly alleviate hardware necessary for the processing.

BRIEF DESCRIPTION OF THE DRAWINGS

FIGS. 5a and 5b show an example of data of weighting coefficient W(I, j) at coefficient position (i, j);

DETAILED DESCRIPTION OF THE PREFERRED EMBODIMENT

Figure 1:
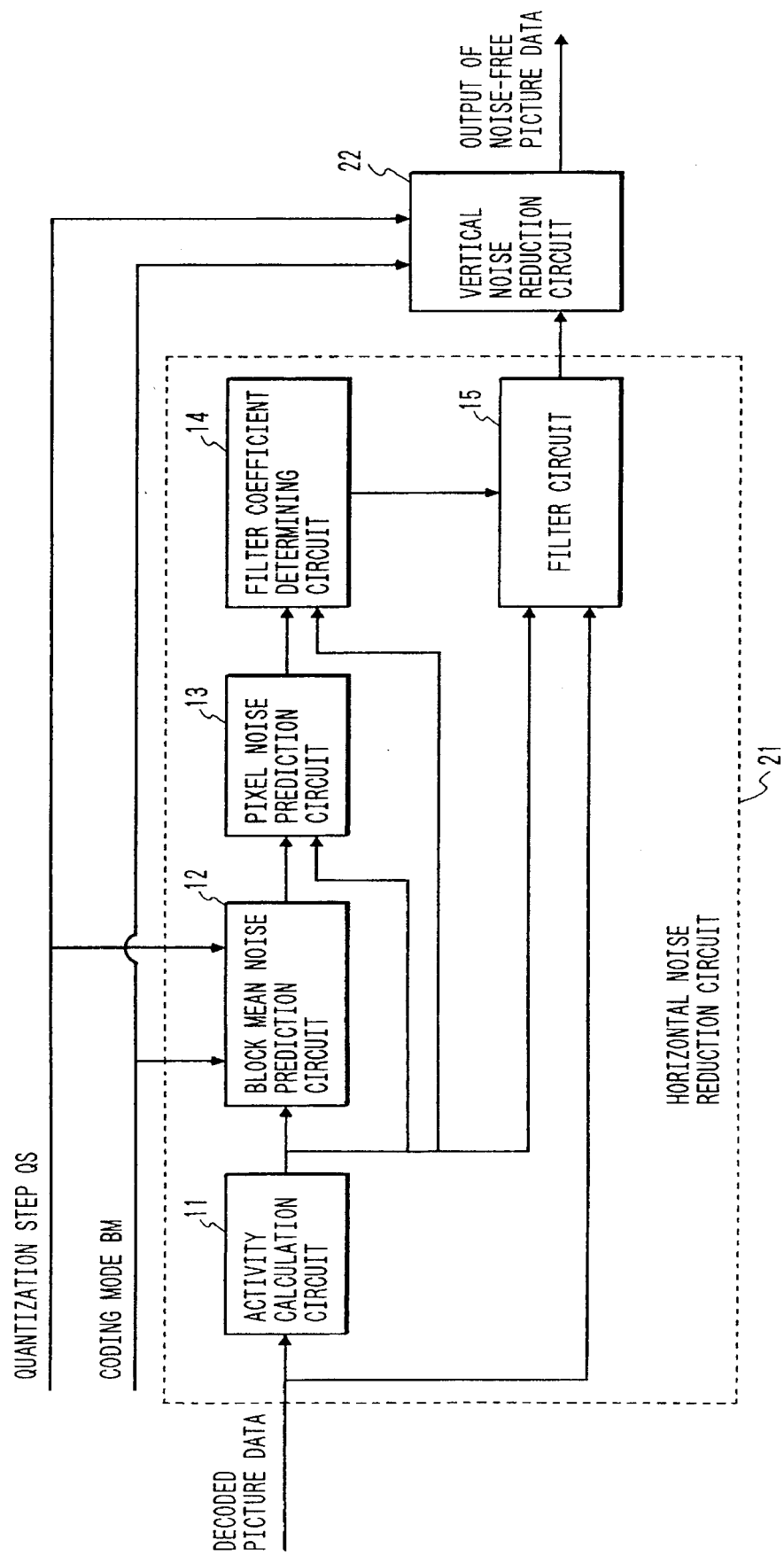
FIG. 1 is a block diagram showing an embodiment of the noise reduction circuit according to the invention.

Now, an embodiment of the invention will be described with reference to the drawings. FIG. 1 is a block diagram showing the constitution of the embodiment of the invention.

Referring to FIG. 1, designated at 21 is a horizontal noise reduction circuit, and at 22 a vertical noise reduction circuit. The horizontal and vertical noise reduction circuits 21 and 22 are the same in the process contents except for that the picture data that are processed are different in the direction. Hereinunder, the horizontal noise reduction circuit 21 will be described in detail, while omitting the description of the vertical noise reduction circuit 22.

In the horizontal noise reduction circuit 21, an activity calculation circuit 11 derives, with respect to picture data obtained by decoding in units of blocks, activity of each pixel data, pixel mean value, maximum activity in a block, and block mean activity. The activity represents the magnitude of luminance variation (i.e., magnitude of picture data deviation). For example, with picture data without luminance variation such as that of sky the activity is small, while it is great with picture data with great luminance variations such as leaves of thickly grown trees.

An block mean noise prediction circuit 12 predicts block mean noise from the maximum block activity obtained in the activity calculation circuit 11, the quantization step for that block and the coding mode for that block. Of the circuit 12, various modifications are possible as will be described later.

A pixel noise prediction circuit 13 derives the predicted value of noise in each pixel from the predicted value of block mean noise obtained in the block mean noise prediction circuit 12 and the block mean activity and pixel activity obtained in the activity calculation circuit 11. A filter coefficient determining circuit 14 determines filter coefficients from the predicted value of pixel noise obtained in the pixel noise prediction circuit 13 and the pixel activity obtained in the activity calculation circuit 11. Filter circuit 15 predicts noise-free picture data from the filter coefficients obtained in the filter coefficient determining circuit 14, the pixel mean value obtained in the activity calculation circuit 11 and the decoded picture data and outputs the predicted noise-free picture data.

The construction and operation of each of the circuits 11 to 15 will now be described in greater detail.

Figure 2:
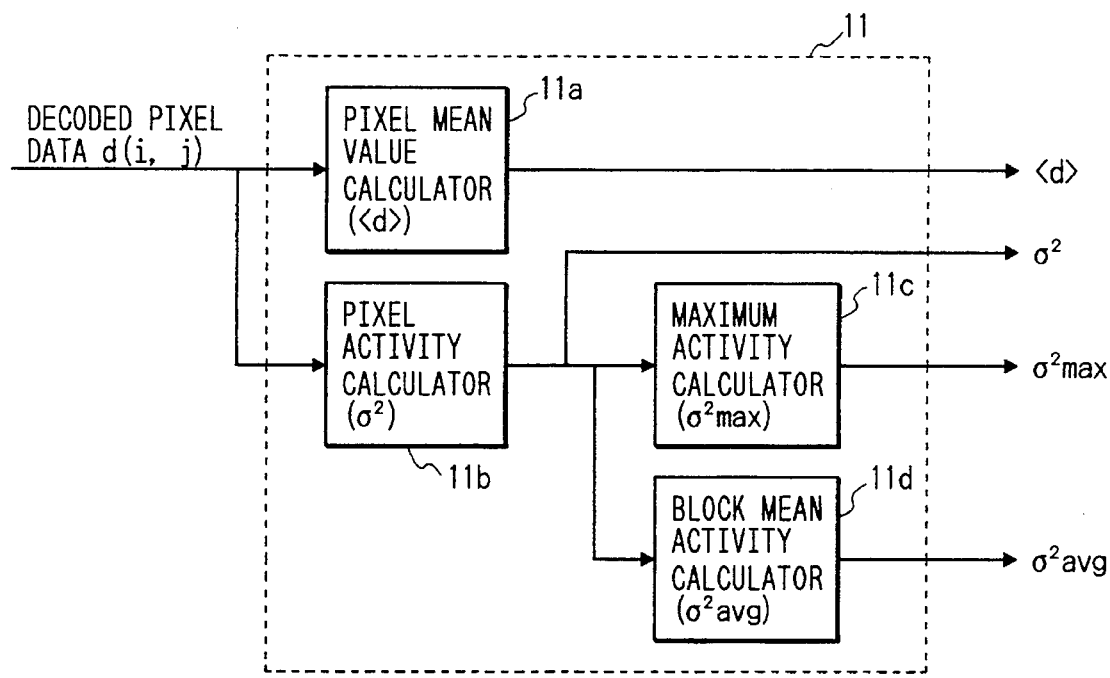
FIG. 2 is a block diagram for explaining the function of an activity calculation circuit shown in FIG. 1.

As for the activity calculation circuit 11, the function thereof, as shown in FIG. 2, can be represented by a pixel mean value calculator 11a, a pixel activity calculator 11b, a maximum activity calculator 11c, and a block mean activity calculator 11d. The circuit 11 derives, from decoded block picture data, the pixel mean value $<d>$, activity a $\sigma^2$ avg of each pixel data, maximum activity in a block a $\sigma^2$ max, and block mean activity $\sigma^2$ avg.

Assuming now that pixel data d(i, j) (i, j=0, ..., N–1, N being a positive integer) in N×N block that is input to the activity calculation circuit 11 after decoding have been DCT coded in units of N×N block and IDCT decoded, the pixel mean value $<d>$ is derived as the mean value of (2m+1) picture data d(i, j–m), ..., d(i, j), ..., d(i, j+m) on the left and right of the same line. In this case, it is possible to make use of such method as using picture data as subject data when the data is in an adjacent block while, in case when the data is outside the frame, repeatedly using boundary portion picture data in the frame.

The pixel data activity $\sigma^2(i, j)$ can be derived as the mean square error of the (2m+1) picture data with respect to the pixel mean value $<d>$. As the maximum activity in the block $\sigma^2$ max, where N=8, is adopted the maximum values among 64 $\sigma^2(i, j)$ in 8×8 blocks. As the block mean activity $\sigma^2$ avg is adopted the mean value of 64 $\sigma^2(i. j)$ in the block.

Figure 3:
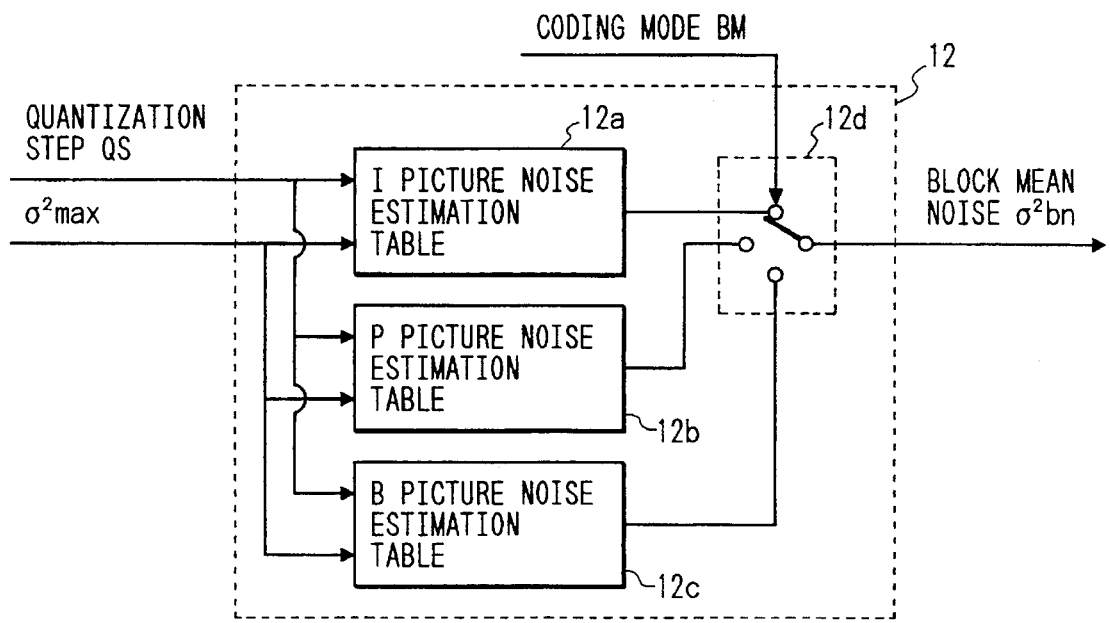
FIG. 3 is a block diagram for explaining the function of a block mean noise prediction circuit shown in FIG. 1.

The function of the block mean noise prediction circuit 12, as shown in FIG. 3, can be represented by an I, a P and a B picture noise estimation table 12a to 12c and a selector 12d for selecting the outputs of the I, P and B picture noise estimation tables 12a to 12c according to coding mode BM. The I, P and B pictures are respectively intra coded picture, predictive code picture and bidirectionally-predictive coded picture, and these three different pictures constitute respective coding modes which are prescribed in MPEG1 system (ISO IS 11172) and or MPEG2 system (ISO IS 13818).

Figure 4:
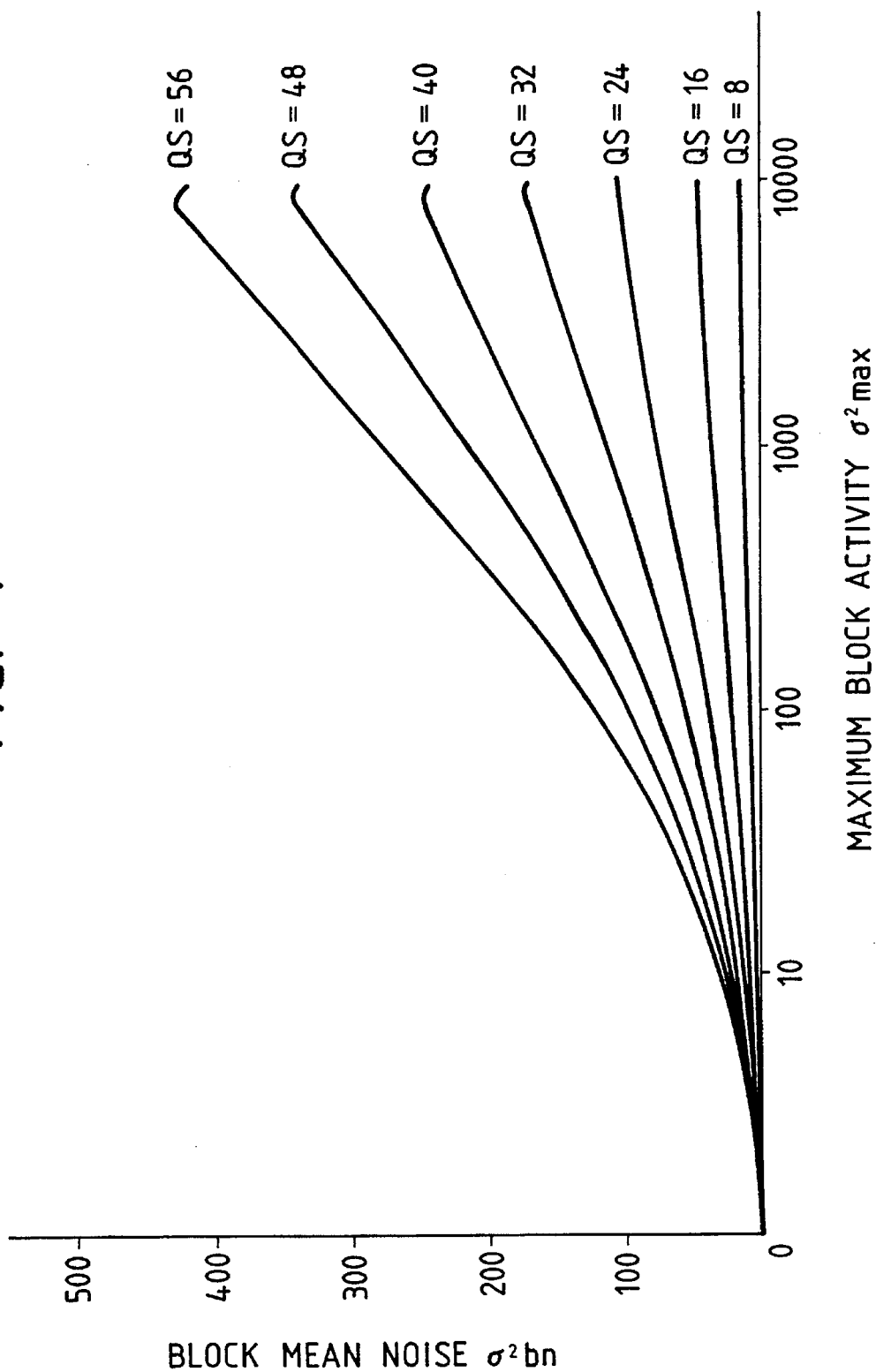
FIG. 4 is a graph showing a specific example of noise prediction table.

The block mean noise prediction circuit 12 dervies block means noise $\sigma^2$bn from the maximum activity in the block $\sigma^2$ max obtained in the activity calculation circuit 11, the quantization step QS for that block as obtained in a decoding circuit (not shown), and the coding mode BM for that block by using the block noise estimation tables 12a to 12c. If the block is one for motion compensation only or the like so that no quantization step can be obtained, the quantization step for the left adjacent block may be used. FIG. 4 shows an example of block noise estimation table.

The block mean noise estimation tables 12a to 12c can be derived in the following method by using a plurality of pictures under test.

(1) Picture compression is made through high efficiency coding with the quantization step QS fixed to minimum value QO. With respect to picture data obtained by decoding the compressed data, the maximum activity $\sigma^2$ in each block is derived in a similar way as in the activity calculation circuit 11. The mean square value of the errors between the original and decoded pictures as block mean noise is derived for each block. A graph is produced with the ordinate axis taken for the block mean noise and the abscissa axis taken for the activity value can be obtained for each block. The graph is produced for each of the three different kinds of the I, P and B pictures. However, in case when the coding mode of the block is the intra mode in the P or B picture, the data obtained there is processed as I picture.

(2) Next, the quantization step is set to the next large quantization step to the least quantization step. Then as in (1) the activity and block mean noise are obtained through coding and decoding, and the graphs are produced.

(3) The step (1) is repeated with respect to a picture under test until the greatest quantization step, and a graph is produced with respect to each quantization step.

(4) The steps (1) to (3) are executed with respect some pictures under test, and all the data are expressed on a single graph.

(5) The quantization step value is used as such in case of uniform quantization step.

However, where quantization step is weighted in the DCT domain in such block transform as DCT, the quantization step may be derived through correction by the following method.

Denoting the quantization step for the block by BQS, the quantization step CQS after the correction can be derived from the following equation (1).

$$CQS = \alpha \times BQS \qquad (1)$$

where $\alpha$ is a correction coefficient. Assuming $W(i, j)$ to be a weighting coefficient at coefficient position $(i, j)$ and $E(i, j)$ to be an energy weighting coefficient at coefficient position $(i, J)$, the correction coefficient $\alpha$ can be expressed by the following equation (2).

$$\alpha = \left\{ \sum_{i,j=0}^{N-1} (W(i,j) \times E(i,j)) \right\} / \left\{ \sum_{i,j=0}^{N-1} (W0(i,j) \times E(i,j)) \right\} \qquad (2)$$

where $W0(i, j)$ is a weighting coefficient in case of uniform quantization step.

FIGS. 5a and 5b show an example of $W(i, j)$ and $W0(i, j)$.

Figures 6, 10:
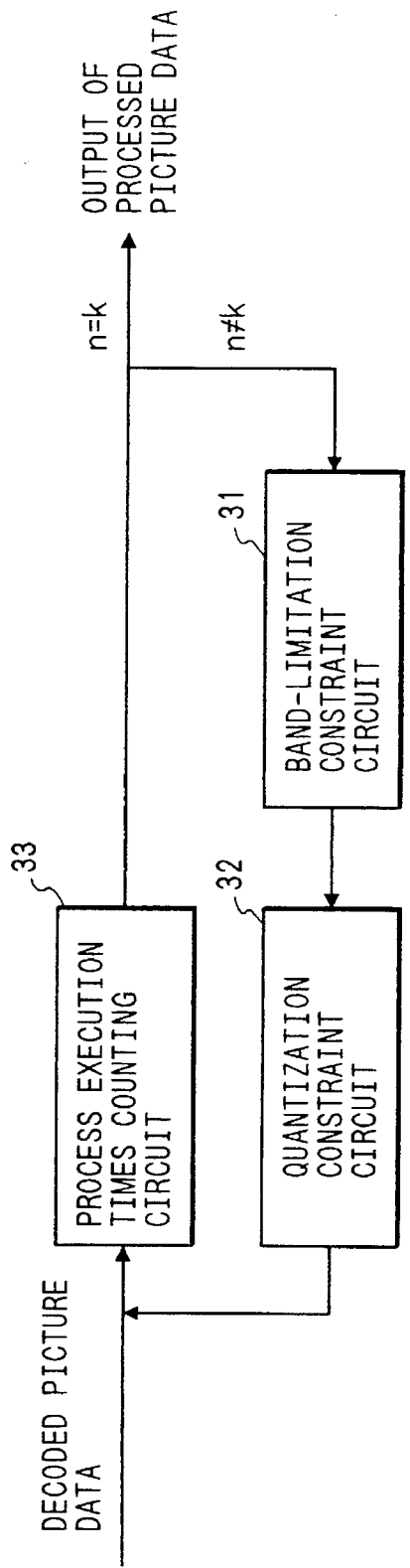
FIG. 6 shows an example of data of energy weighting coefficient E(i, j) at coefficient position (i, j)
FIG. 10 is a block diagram showing a prior art noise reduction circuit.

$E(i, j)$ can be derived from the following equation (3).

$$E(i, j) = FV(FH(e(i, i))) \qquad (3)$$

where $(i, j=0, \ldots, N-1)$
where $FV( )$ and $FH( )$ represent orthogonal transform in the vertical direction and that in the horizontal direction, respectively. $e(i, j)$ represents an autocovariance matrix in 1-st order Markov process having one-step correlation coefficient $\rho$. As an example, FIG. 6 shows $E(i, j)$ in case when using DCT transforms as the horizontal and vertical transforms and setting the correlation coefficient $\rho$ to $\rho=0.91$.

(6) By producing the block noise estimation table for each of the luminance and chrominance signals, it is possible to obtain more accurate prediction.

The pixel noise predicting circuit 13 derives predicted noise $\sigma^2 n(i, j)$ of each pixel from block predicted noise $\sigma^2 bn$ obtained in the block mean noise prediction circuit 12, block mean activity $\sigma^2$ avg obtained in the activity calculation circuit 11, and pixel activity $\sigma^2(i, j)$. In this case, noise is pronounced where the pixel activity is low, and thus it is possible to express the predicted noise $\sigma^2 n(i, j)$ of pixel in the form of inverse proportion to the pixel activity $\sigma^2(i, j)$ as given by the equation (4).

$$\sigma^2 n(i, j) = \sigma^2 bn \times \sigma^2 \text{avg} / \sigma^2(i, j) \qquad (4)$$

With pixels at the block boundary, the pixel activity is high because of a gap in the block boundary. Thus, in the block boundary the pixel noise prediction can be derived as a constant multiple of the block noise $\sigma^2 bn$ as given by the equation (5).

$$\sigma^2 n(i, j) = \varepsilon \sigma^2 bn \qquad (5)$$

($\varepsilon$ being a constant, $\varepsilon > 0$)
For instance:
$\varepsilon = \varepsilon_1$ for $j=0, N-1$, and
$\varepsilon = \varepsilon_2$ for $J=1, N-2$.

The filter coefficients determining circuit 14 determines filter coefficient from predicted pixel noise $\sigma^2 n(i, J)$ obtained in the pixel noise predicting circuit 13 and pixel activity $\sigma^2(i, j)$ obtained in the activity calculation circuit 11. Denoting the decoded pixel data by $d(i, j)$, the original picture data by $s(i, j)$ and the noise component by $n(i, j)$, the decoded pixel data $d(i, j)$ can be represented by the following equation (6).

$$d(i, j) = s(i, j) + n(i, j) \qquad (6)$$

Further, by the least mean square method the original picture data $(i, j)$ can be expressed by the following equation (7).

$$s(i, j) = <d> + \beta(d(i, j) - <d>) \qquad (7)$$

where $\beta$ is represented by the equation (8).

$$\beta = \sigma^2 s(i, j) / (\sigma^2 s(i, j) + \sigma^2 n(i, j)) \qquad (8)$$

The above $\sigma^2 s(i, j)$ is given by the equation (9) when $\sigma^2 d(i, j) - \sigma^2 n(i, j) > 0$ given by the equation (10) when $\sigma^2 d(i, j) - \sigma^2 n(I, j) \leq 0$.

$$\sigma^2 s(i, j) = \sigma^2 d(i, j) - \sigma^2 n(i, j) \qquad (9)$$

$$\sigma^2 s(i, j) = 0 \qquad (10)$$

Denoting the number of taps by $(2m+1)(m=1, 2, \ldots)$, the filter coefficient $Ck$ $(k=-m, \ldots, 0, \ldots, m)$ can be expressed by the equations (11) and (12).

$$Ck = (1-\beta)/(2m+1), \text{ when } k \neq 0 \qquad (11)$$

$$Ck = (1 + 2m\beta)/(2m+1), \text{ when } k = 0 \qquad (12)$$

The filter circuit 15 predicts noise-free picture data $s(i, j)$ from the filter coefficient $Ck$ obtained in the filter coefficient determining circuit 14, the mean pixel value $<d>$ obtained in the activity calculation circuit 11, and the decoded pixel data $d(i, j)$, and outputs the predicted picture data. The picture data $s(i, j)$ can be derived using the equations (7) to (12), and is given by the equation (13).

$$s(i, j) = \sum_{k=-m}^{m} Ck \times d(i, j+k) \qquad (13)$$

The luminance signal vertical noise reduction circuit 22 processes picture having been processed in the horizontal noise reduction circuit 21. The vertical noise reduction circuit 22 is different from the horizontal noise reduction circuit 21 in the direction in which the picture data is processed. In addition, owing to the effect of noise reduction in the horizontal noise reduction circuit 21, in the pixel noise prediction obtainable from the vertical noise reduction circuit 22 the product of factor $\tau$ ($0 < \tau \leq 1$) and $\sigma^2 n(i, j)$ may be made to be the predicted pixel noise. For the remainder of the process, the vertical noise reduction circuit 22 is quite the same as the horizontal noise reduction circuit 21.

The chrominance signal can be processed entirely in the same way as the luminance signal.

In carrying out the invention, various modifications of the block mean noise prediction circuit 12 are possible.

Figure 7:
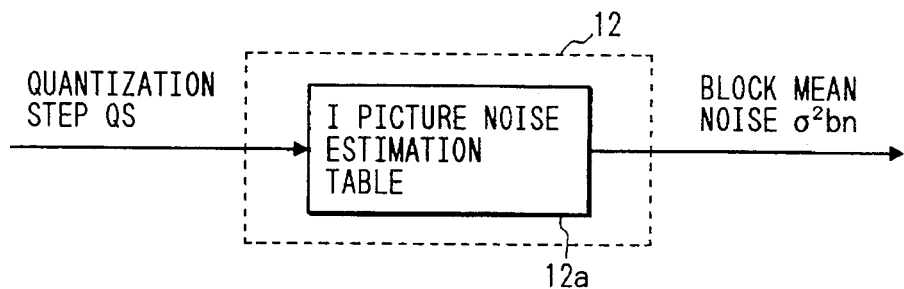
FIG. 7 is a block diagram for explaining the function of a modification of block mean noise prediction circuit.

(Modification 1) In this modification, as shown in FIG. 7, the block mean noise prediction circuit 12 shown in FIG. 1 comprises a sole I picture noise estimation table 12a, and quantization step QS is used as a parameter with which to access the I picture noise estimation table 12a. In this modification, the maximum activity $\sigma^2$ max in the abscissa axis of FIG. 4 is fixed (to 1,000, for instance), and the quantization step QS is used as parameter to read out mean noise $\sigma^2 bn$. In the above way, it is possible to reduce the speed of operation of the block mean noise prediction circuit 12.

Figure 8:
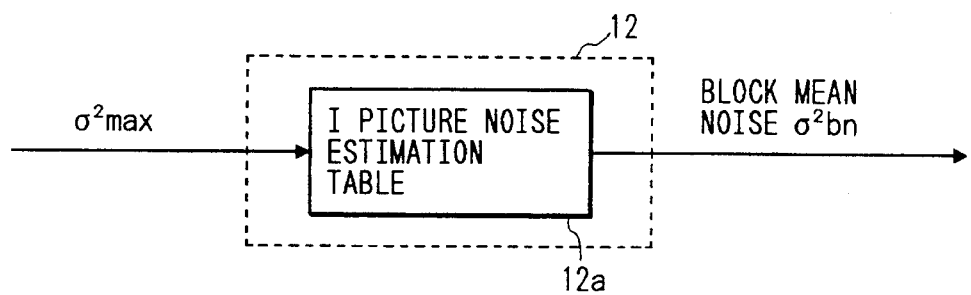
FIG. 8 is a block diagram for explaining the function of a different modification of the block mean noise prediction circuit.

(Modification 2) In this modification, unlike modification 1, as shown in FIG. 8, the quantization step QS is fixed (to QS=40, for instance), and the maximum activity $\sigma^2$ max is used as a parameter to derive the mean noise $\sigma^2 bn$ from the I picture noise estimation table 12a. In this modification, like modification 1, it is possible to derive the mean noise $\sigma^2 bn$ quickly.

Figure 9:
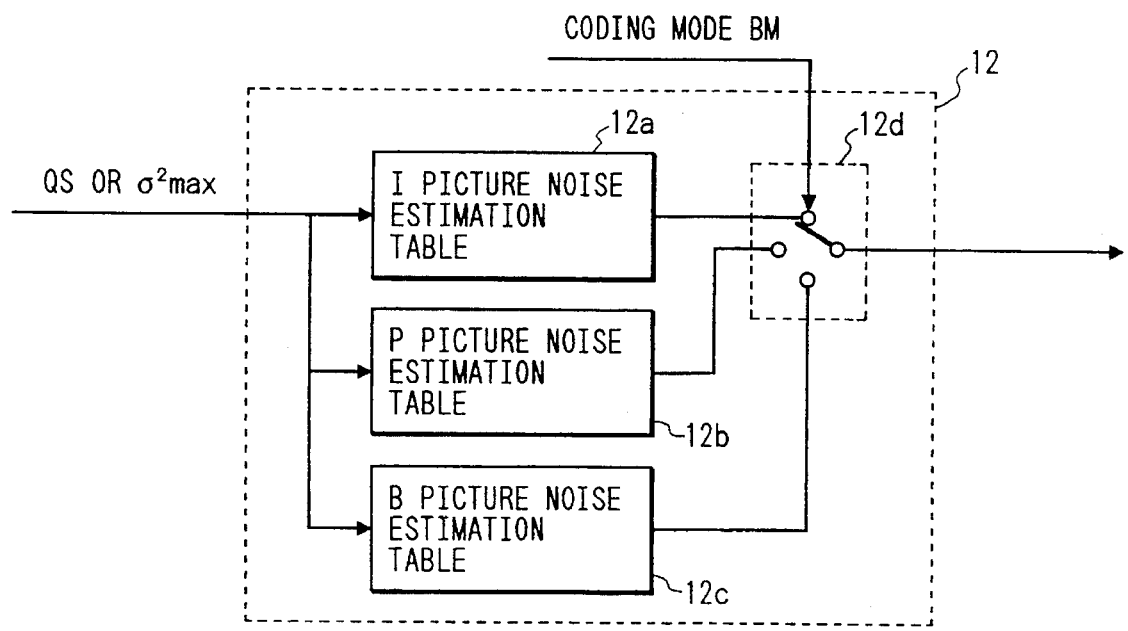
FIG. 9 is a block diagram for explaining the function of a further modification of the block mean noise prediction circuit.

(Modification 3) In this modification, as shown in FIG. 9, the I, P and B picture noise estimation tables 12a to 12c are accessed with the quantization step QS or maximum activity $\sigma^2$ max as parameter, and selection among the three different outputs is made according to the coding mode BM.

Various further modifications are possible as in the following.

For example, the order of processes of the noise reduction circuits may be first in the vertical direction and then in the horizontal direction.

As for the frame size, it is possible to apply the invention to pictures 352 pixels by 240 lines as used in MPEG1 or the like or 720 pixels by 480 lines as prescribed in ITU-R601 Standards.

Further, the frame configuration may be the noninterlaced structure as in MPEG1 or the interlaced configuration as in MPEG2. In the case of the interlaced configuration, more accurate noise reduction is possible by processing picture with motion in units of fields while processing picture with less motion in units of frames.

As for the coding system, it is possible to apply the invention, without dependence on the coding system, to a vector quantization system or the like other than DCT so long as the system processes picture in units of blocks. As for the block size, the invention is applicable to various sizes other than the case of N=8, i.e., 8 pixels by 8 lines, for instance the case of N=16, i.e., 16 pixels by 16 lines, or N=4, i.e., 4 pixels by 4 lines.

As for the number (2m+1) of filter taps, it is possible to set the value of m from the standpoints of the amount of calculation and accuracy. For example, in case of m=1, the amount of calculation required for the processing is greatly reduced compared to the case of m=3, but the noise prediction accuracy is reduced to reduce the effects of reducing the blocking noise or mosquito noise.

Further, the invention is applicable not only to motion pictures but also to still pictures, and in this case it is possible to use I picture block mean noise table having been derived in advance.

Further, where high speed is required, it is possible to increase speed or alleviate process load in the following methods. In this case, however, it is forecast that there is a possibility that the effect of noise reduction is reduced.

(1) In the derivation of mean block noise $\sigma^2 bn$ in the block mean noise prediction circuit 12, it is possible to set the quantization step correction coefficient $\alpha$ to $\alpha=1$ and thus dispense with the operation concerning $\alpha$ in the equation (2).

(2) It is possible to omit the pixel noise prediction circuit 13 and replace the predicted noise $\sigma^2 n(i, j)$ for each pixel with the predicted block mean noise $\sigma^2 bn$ obtained in the block mean noise prediction circuit 12. That is;

$$\sigma^2 n(I, j) = \sigma^2 bn \quad (14)$$

(3) The block mean noise $\sigma^2 bn$ is predicted by only the quantization step. In this case, the pixel noise prediction circuit 13 is omitted. In addition, the block mean noise prediction circuit 12, as in the above modification 1, derives the predicted block mean noise $\sigma^2 bn$ by setting the coding mode BM to the I picture and setting the maximum activity $\sigma^2$ max to an intermediate value on the graph for example. Then, with the predicted block mean noise $\sigma^2 bn$ as the predicted pixel noise $\sigma^2 n(i, j)$ in the block, the process subsequent to that in the filter coefficient determining circuit 14 is done for noise reduction.

(4) Noise reduction is made without use of quantization step or coding mode data but by using the sole picture data. In this case, as shown in modification 2 above, the quantization step is fixed to a certain value, while the coding mode BM is fixed to the I picture for example. Under these conditions, the block mean noise prediction circuit 12 derives the predicted block mean noise $\sigma^2 bn$ from the maximum block activity $\sigma^2$ max and the block mean noise prediction table. Then, using the predicted block mean noise $\sigma^2 bn$ the process subsequent to that in the pixel noise prediction circuit 13 is made for noise reduction.

According to the invention, noise is reduced in units of picture frames through prediction of noise in units of blocks and noise in units of pixels. It is thus possible to remove noise only at the block boundary and also remove only noise along an edge while retaining the edge portion. That is, it is possible to remove block noise or mosquito noise. It is thus possible to predict noise-free original picture data. Visual characteristic deterioration of the decoded image thus can be greatly improved.

Further, the sequence of operations involved need not be repeated, thus permitting great increase of the processing speed and greatly reduce hardware that is necessary for the processing.

MPEG1 system block noise estimation tables were produced through MPEG1 using pictures under test (such as flower garden, mobile calender, etc.) used in ISO. Using the results, reproduced picture in case of and that not in case of utilizing the noise reduction circuit according to the invention were compared in connection with other moving picture sequences (such as sport scenes and TV commercials). It was confirmed that visual noise reduction of 70% or above could be obtained with respect to blocking noise or mosquito noise around subtitles in sport scenes involving quick movements.

What is claimed is:

1. A noise reduction apparatus for reducing noise in decoding of moving picture sequence after decoding thereof, comprising:

activity calculation means for deriving the activity of the decoded picture data for each block;

block mean noise prediction means for predicting mean noise in each block of the decoded picture from a quantization step for that block;

pixel noise prediction means for predicting pixel noise from the predicted block mean noise output by the block mean noise prediction means and block activity and pixel activity derived by the activity calculation means;

means for predicting noise-free original picture from the predicted pixel noise and decoded picture data in that block.

2. The noise reduction apparatus for reducing noise in decoding of moving picture sequence according to claim 1, wherein the block mean noise prediction means is an I picture noise estimation table.

3. A noise reduction apparatus for reducing noise in decoding of moving picture sequence after decoding thereof, comprising:

activity calculation means for deriving the activity of the decoded picture data for each block;

block mean noise prediction means for predicting mean noise in a block of the decoded picture from a quantization step for that block and coding mode;

pixel noise prediction means for predicting pixel noise from the predicted block mean noise output by the block mean noise prediction means and block activity and pixel activity derived by the activity calculation means; and means for predicting noise-free original picture from the predicted pixel noise and the decoded picture data in that block.

4. The noise reduction apparatus for reducing noise in decoding of moving picture sequence according to claim 3, wherein the block mean noise prediction means is at least either an I picture noise estimation table, a P picture noise estimation table, and a B picture noise estimation table.

5. A noise reduction apparatus for reducing noise in decoding of moving picture sequence after decoding thereof, comprising:

activity calculation means for deriving the activity of the decoded picture data for each block;

block mean noise prediction means for predicting mean noise in that block from the block activity obtained in the activity calculation means;

pixel noise prediction means for predicting pixel noise from the predicted block mean noise output by the block mean noise prediction means and block activity and pixel activity derived by the activity calculation means;

means for predicting noise-free original picture from the predicted pixel noise and the decoded picture data in the block.

6. The noise reduction apparatus for reducing noise in decoding of moving picture sequence according to claim 5, wherein the activity calculation means derives the activity of at least either luminance signal or chrominance signal.

7. A noise reduction apparatus for reducing noise in decoding of moving picture sequence after decoding thereof, comprising:

activity calculation means for deriving the activity of the decoded picture data for each block;

block mean noise prediction means for predicting mean noise in the block of picture from the block activity obtained in the activity calculation means, the quantization step for each block and coding mode;

pixel noise prediction means for predicting the pixel noise from the predicted block mean noise output by the block mean noise prediction means and block activity and pixel activity derived by the activity calculation means; and means for predicting noise-free original picture from the predicted pixel noise and the decoded picture data in the block.

8. The noise reduction apparatus for reducing noise in decoding of moving picture sequence according to claim 7, wherein the activity calculation means derives the activity of at least either luminance signal or chrominance signal.

* * * * *